United States Patent [19]

James et al.

[11] Patent Number: 4,743,154
[45] Date of Patent: May 10, 1988

[54] PALLET INSPECTION AND REPAIR SYSTEM

[75] Inventors: Raymond E. James; Donald Karner, both of Chicago, Ill.

[73] Assignee: American Pallet Systems, Inc., Melrose Park, Ill.

[21] Appl. No.: 871,855

[22] Filed: Jun. 9, 1986

[51] Int. Cl.$^4$ .................. B65G 59/06; B65G 60/00
[52] U.S. Cl. ...................................... 414/33; 29/432;
 29/709; 29/721; 108/112; 198/412; 209/703;
 221/221; 221/251; 414/95; 414/101; 414/127;
 414/759; 414/786
[58] Field of Search .................... 414/32, 33, 95, 96,
 414/101, 125, 126, 127, 754, 758, 759, 760, 768,
 774, 779, 782, 784, 786; 269/910; 29/432,
 402.01, 402.03, 700, 709, 710, 711; 221/221,
 251; 209/702, 703, 942; 198/412; 108/1, 62, 112

[56] References Cited

U.S. PATENT DOCUMENTS

| | | | |
|---|---|---|---|
| 3,038,615 | 6/1962 | Roth et al. | 414/127 |
| 3,069,050 | 12/1962 | Brettrager . | |
| 3,231,101 | 1/1966 | Cooper | 414/101 X |
| 3,478,897 | 11/1969 | Dykeman | 414/96 X |
| 3,557,439 | 1/1971 | Dykeman . | |
| 3,757,971 | 9/1973 | Frish . | |
| 3,954,170 | 5/1976 | Schlough | 414/760 X |
| 4,180,361 | 12/1979 | Longinotti | 414/127 X |
| 4,273,490 | 6/1981 | James . | |
| 4,285,110 | 8/1981 | Fagre, Jr. . | |
| 4,346,506 | 8/1982 | Martindale . | |
| 4,403,388 | 9/1983 | Belcher . | |
| 4,508,483 | 4/1985 | Hessling et al. . | |

FOREIGN PATENT DOCUMENTS

| | | | |
|---|---|---|---|
| 55-130402 | 10/1980 | Japan | 414/759 |
| 57-51620 | 3/1982 | Japan | 414/127 |

Primary Examiner—Leslie J. Paperner
Attorney, Agent, or Firm—Emrich & Dithmar

[57] ABSTRACT

A pallet repair and inspection system includes pallet destacking apparatus for automatically dispensing pallets from stack of vertical pallets one at a time and discharging the pallets onto an inspection table. The destacking apparatus includes a vertically reciprocating table onto which the stack of pallets is driven and horizontally reciprocating forks which are operated to suspend all but the lowermost pallet as the table is successively lowered and raised between a pallet discharge height and a pallet pick-up height, to discharge the pallets into the inspection table one at a time. The top of the inspection table is foldable to define a cradle for one end of the pallet, orienting the pallet generally vertically, allowing inspection of its top and bottom surfaces.

40 Claims, 9 Drawing Sheets

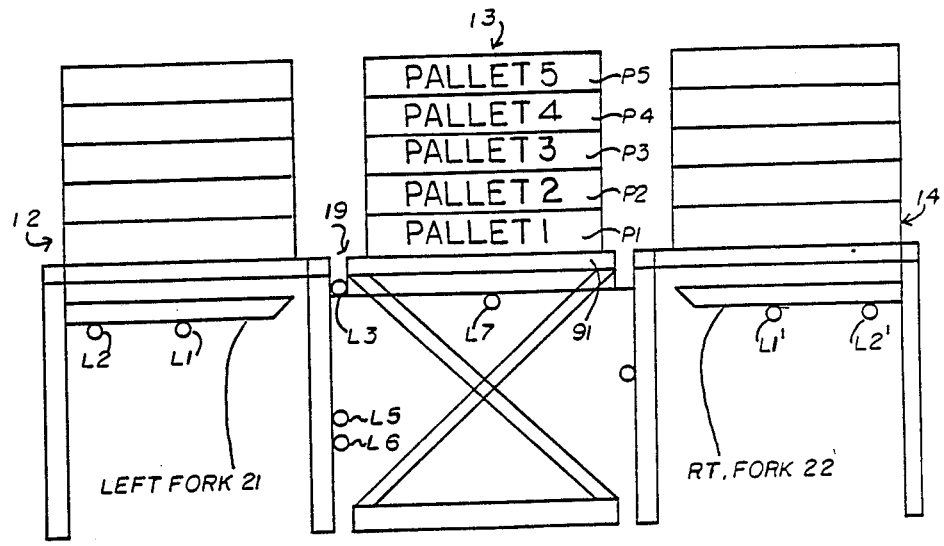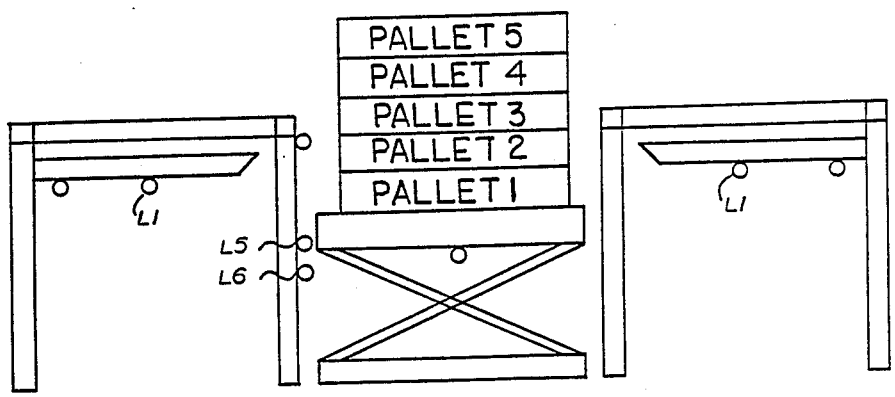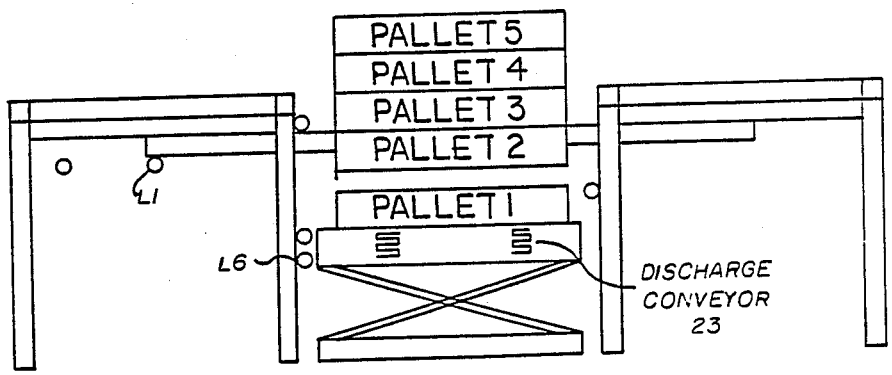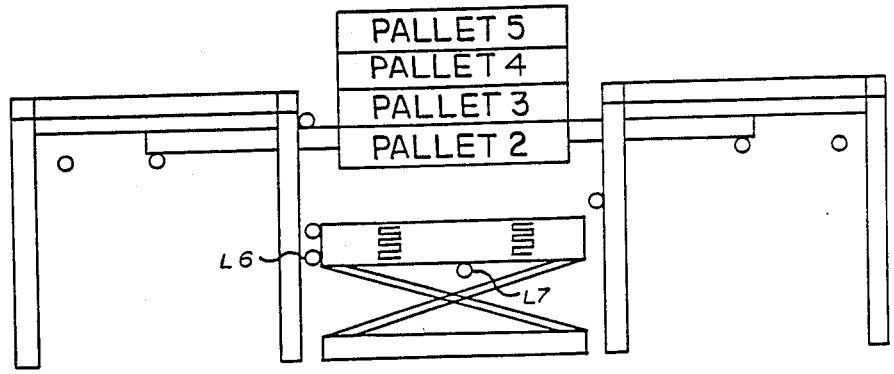

PALLET INSPECTION AND REPAIR SYSTEM

BACKGROUND OF THE INVENTION

This invention relates to pallet repair systems, and more particularly to a modularized pallet repair system including a pallet destacking apparatus, pallet transfer and transport apparatus and pallet inspection and/or repair tables which can be arranged to define different pallet inspection and repair systems as dictated by application.

Wooden pallets are used extensively to transport merchandise, equipment, or other loads in manufacturing, warehousing, and distribution operations. Conventionally, the pallets are moved by forklift trucks or similar machinery so that damage to pallets is very common. There are approximately two billion pallets in circulation in the United States. All of these pallets will be replaced or repaired within a three to five year period. For economic reasons, it is becoming common practice to repair damaged pallets rather than to discard them. One reason is replacement cost because of the relative short pallet lifetime and the large number of pallets used. In manufacturing, warehousing and distribution operations, it is possible that for one operating company, as many as 300 pallets may be damaged in one day to an extent requiring repair.

The economics of repairing damaged pallets rather than discarding them has been enhanced through the introduction of various pallet repair apparatus. Known pallet repair apparatus generally includes a series of conveyors including an input stage which receives pallets one at a time and transports the pallet to a repair zone where broken boards are removed and replaced with new boards. A further conveyor transports the repaired pallet to a pallet stacker which stacks the repaired pallets for removal from the pallet repair apparatus.

It is common for a stack of pallets, in the order of 15 to 20 high, to be delivered by way of a fork lift truck or the like to the input of the pallet repair apparatus. Some of the pallets may be in need of repair whereas others of the pallets in the stack may, although damaged, may not require repair at the present time. In such case, it would be desirable to sort out those pallets which require repair from those which do not require repair at the present time. Also, it would desirable to have a pallet dispenser which automatically feeds pallets from a stack of pallets, one at a time to a conveyor means to transport the pallets to a location for an inspection or/and repair. Also, in view of the potentially large number of pallets which may have to be inspected and repaired, it would be desirable to have a pallet inspection table which permits pallets to be turned over quickly and easily and with minimum effort by the operator, permitting the operator to inspect both the top and bottom surfaces of the pallet. It would also be desirable to have a pallet inspection and repair system including modularized apparatus allowing the configuration of system to be modified. For example, the number of pallet inspection modules can be increased to allow changing locations of pallet inspection.

SUMMARY OF THE INVENTION

It is an object of the present invention to provide an improved pallet inspection and repair system.

Another object of the invention is to provide a pallet and repair system including a novel pallet destacker and a novel pallet inspection table.

Another object of the invention is to provide a method and apparatus for destacking pallets is a simple and effective manner.

Another object of the invention is to provide a pallet inspection table which allows pallets to be turned over easily and quickly, and which permits pallet inspection operations to be carried out with minimal noise and without raising dust.

A further object is to provide a pallet inspection table which is particularly suitable for use with an automatic pallet dispenser apparatus which dispenses pallets from a stack of pallets in a relatively fast rate.

In accordance with the invention, there is provided a pallet destacking apparatus which is comprised of pallet support means; pallet discharge conveyor means and control means. The pallet support means includes a vertically reciprocating pallet lift means having an associated lift drive means for raising and lowering the lift means and pallet suspension means having an associated drive means. In a pallet dispensing operation, a vertical stack of pallets is placed on the lift means and the lift means is driven to a pallet suspension height. The control means energizes the suspension drive means when the lift means reaches the pallet suspension height to cause the pallet suspension means to suspend the pallets except the lowest pallet of the stack at the pallet suspension height while the lift means is driven from the pallet suspension height to a pallet discharge height. When the lift means reaches the pallet discharge height, the control means energizes the pallet discharge conveyor means to discharge the pallet carried by the lift means from the destacking apparatus. The lift means is then driven back to the pallet suspension height to re-engage the stack, a second pallet is released from the stack, while the remaining pallets are suspended above the lift means. The second pallet is then lowered to the discharge height on the lift means for discharge from the destacking apparatus. The process is repeated until all of the pallets in the stack have been discharged.

Further in accordance with the invention there is provided a pallet inspection table comprised of support means; a foldable table top; and actuating means. The support means includes first and second side rails extending in parallel spaced relationship and supported above floor level. The table top has a forward edge, a rearward edge and a pair of side edges and means defining a folding axis which extends between its side edges defining forward and rearward table top portions. A fixed mounting means pivotally mounts the forward edge of the table top between the side rails, and a movable mounting means mounts the rearward edge of the table top between the side rails. The actuating means is mounted to the support means and connected to the table top for driving the table top between an unfolded or pallet receiving position and a folded or pallet inspection position in which the table top is folded along the folding axis with the table top portions extending at an angle relative to one another defining a cradle which receives one end of a pallet being inspected, apending the pallet allowing both top and bottom surfaces of the pallet to be inspected.

The invention further provides a pallet inspection and repair system comprising in combination: pallet destacking means including first pallet in-feed conveyor means, second pallet in-feed conveyor means and pallet dispensing means located between the first and second in-feed conveyor means for receiving a vertical stack of pallets from a selected one of the in-feed conveyor means. The dispensing means has first and second discharge outlets for discharging pallets one at a time. First and second pallet transfer means are located at the first and second discharge outlets, respectively. The first transfer means transfers pallets discharged thereto to first and second pallet inspection stations and the second transfer means transfers pallets discharged thereto to third and fourth inspection stations. Each of the inspection stations includes a pallet inspection table for inverting each pallet transported thereto, and a pallet stacking means for restacking pallets after inspection.

Transfer means may be provided at the discharge outlets for enabling an operator to transfer undamaged pallets to the pallet stacking means and to transfer damaged pallets to a pallet repair station. The pallet repair station may include conveyor means for transporting pallets from the transfer means to the inspection table for inspection and repair by an operator.

DESCRIPTION OF THE DRAWINGS

FIGS. 9-15 are simplified representations of operating sequences for the pallet destacker; and, FIGS. 16 and 17 illustrate two embodiments for modularized pallet inspection and repair system provided by the present invention.

DESCRIPTION OF PREFERRED EMBODIMENTS

Figure 1:
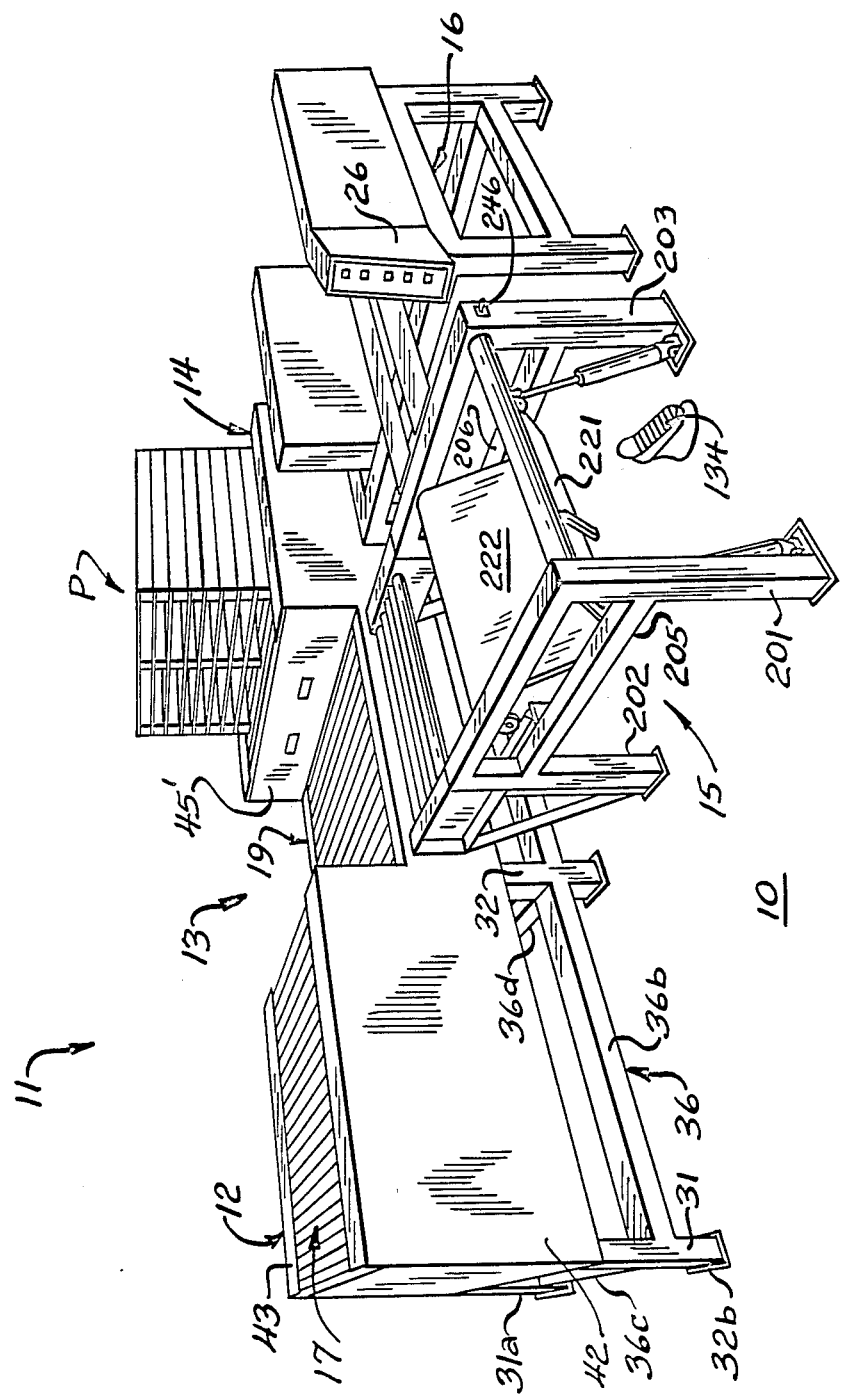
FIG. 1 is a perspective view of a pallet inspection and repair system provided by the present invention.

Referring to FIG. 1, there is illustrated a pallet inspection and repair system 10 provided by the present invention. The system 10 includes a pallet destacker apparatus 11 including a pallet stack in-feed conveyor 12, a pallet dispenser 13, a pallet stack in-feed conveyor 14, a pallet inspection table 15 and a pallet stacking apparatus 16.

In accordance with a feature of the invention, the system 10 employs a modular concept, with each unit such as in-feed conveyors 12 and 14, the pallet dispenser 13, the inspection table 15 and the pallet stacker 16, being approximately five feet in length and width. This allows modifying the configuration of the system, adding or removing modules as necessary to provide a desired type and number of operator stations, allowing inspection only, inspection and repair, etc. as dictated by the specific application. In a preferred embodiment, the in-feed conveyors 12 and 14 are attached to the pallet dispenser 13, the pallet inspection table 15 and pallet stacking apparatus 16 being independent modules or units not physically connected to the destacking unit.

Figure 2:
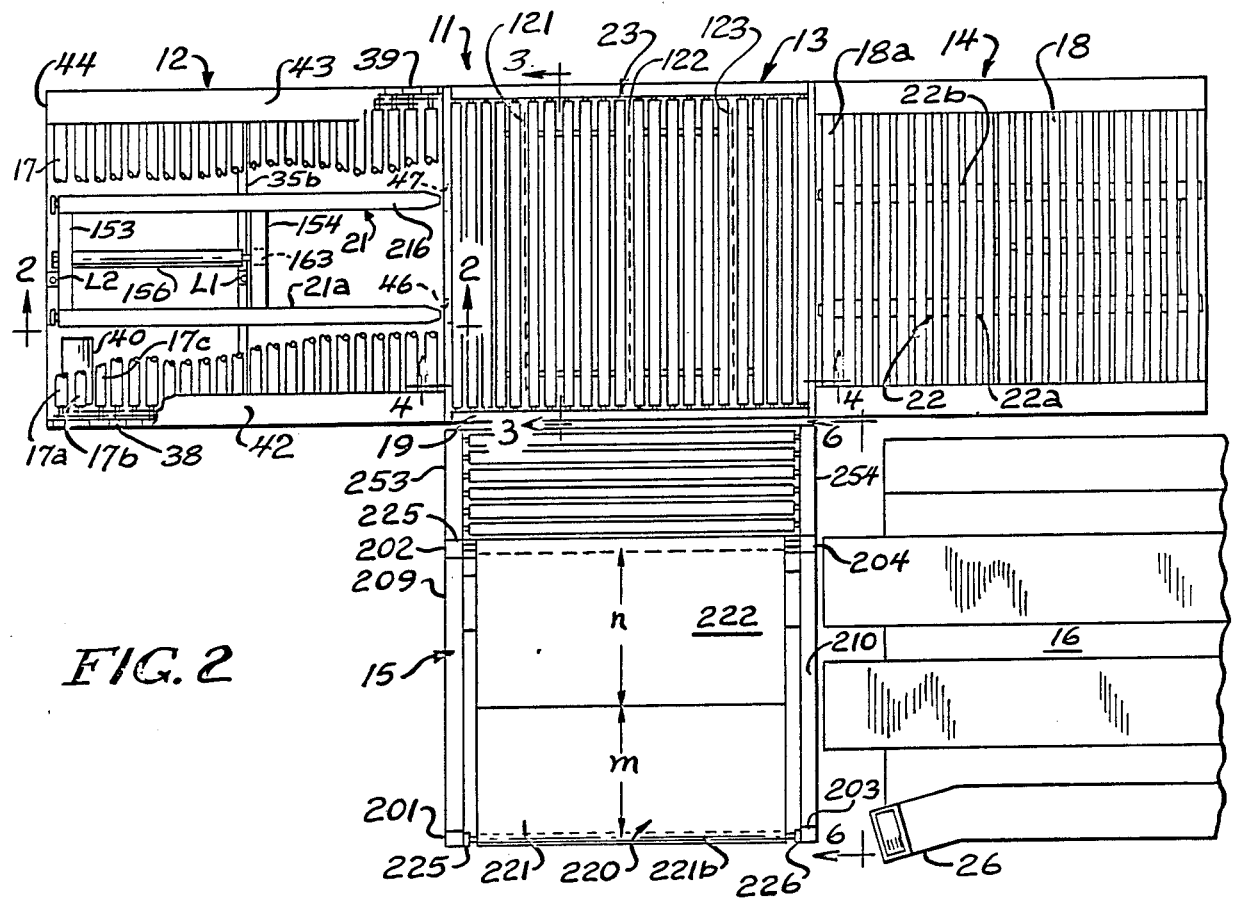
FIG. 2 is a top plan view of a pallet destacker apparatus and pallet inspection table of the system shown in FIG. 1.

Referring to FIGS. 1 and 2, the pallet in-feed conveyor 12, which is located at the left hand side of the apparatus 10 when viewed from the operator position at the foot of the inspection table 15, includes a roller conveyor 17 onto which is loaded a stack of pallets (not shown) to be fed into the dispenser 13, the roller conveyor 17, including driven rollers 17a, 17b, 17c, etc., driving the stack of pallets into the pallet dispenser apparatus 13. Similarly, right in-feed conveyor 14 includes a roller conveyor 18 for driving a vertical stack of pallets P into the dispenser 13. The input conveyors 12 and 14 obviate the need to stack pallets on the floor prior to transfer to the pallet dispenser thereby saving floor space. The pallet dispenser apparatus 13 includes a vertically reciprocating lift table 19, pallet suspension apparatus 20 including a left side reciprocating fork 21 located beneath the left-hand roller conveyor 17, and a right side reciprocating fork 22 located beneath the right-hand roller conveyor 18 and a pallet discharge conveyor 23, comprised of a plurality of drive chains 121-123 (FIG. 2) bearing lugs which engage a pallet to be driven off of the table 19 and push the pallet off as the chains are driven through a complete revolution.

As will be described in detail with reference to FIGS. 9-15, the pallet destacker 13 is operated under the control of a programmable logic controller 25 (FIG. 1) which receives inputs from an operator control panel on an operator console 26 mounted on the pallet stacker 16 and from a plurality of limit switches L1-L7, L1', and L2' (FIG. 9) which provide outputs indicative of the operation of various elements of the apparatus, as will be described. The lift table 19 while at a PALLET STACK TRANSFER height (FIG. 9) receives a vertical stack of pallets 300 which is fed thereto from either the left-hand conveyor 12 or the right-hand conveyor 14. The lift table is then driven down to a TINES OUT height (FIG. 10) to position the stack of pallets with the second lowest pallet 302 in the stack in alignment with the reciprocating forks 21 and 22. The forks are then driven into openings between stringers in the pallet (FIG. 11). The length of the forks enables the two forks 21, 22 to extend into opposite sides of the pallet with the ends of the forks being spaced apart approximately four inches from one another. This enables the forks to "catch" a pallet even if one or more deck boards is missing, or if one of the pallets in the stack is upside down, and allows the apparatus to process pallets of different sizes in a given stack. The lift table 19 is then lowered further to a PALLET DISCHARGE height (FIG. 11), carrying with it the lowermost pallet 301 of the stack, the remaining pallets 302-305 of the stack being suspended by the extended forks 21 and 22. The pallet P1 removed from the stack is then driven off the lift table 19 by the pallet discharge conveyor 23 onto the pallet inspection table 15 (FIG. 1). The pallet received on the inspection table 15 after inspection is fed into the pallet stacker 16. The table 19 is raised to a PALLET PICK-UP height, to engage the stack of pallets (FIG. 13), and the forks 21, 22 are withdrawn. The table is then lowered to the TINES OUT height (FIG. 14) to align the second lowest pallet 303 in the stack with the forks 21, 22 which are then extended, to support pallets 303-305 while pallet 302 is discharged. The process continues until all five pallets have been discharged. A pallet discharge cycle, including driving the lift table to the pallet pick-up height, releasing a pallet from a suspended stack, and lowering and discharging the pallet from the apparatus 11 takes approximately ten to twelve seconds.

More specifically, with reference to FIGS. 1, 2 and 2A, the pallet stack in-feed conveyors 12 and 14 are identical in construction, and so only conveyor 12 will be discussed. The left-hand in-feed conveyor 12 feeds a vertical stack of pallets from left to right onto the lift table 19 of pallet dispenser 13 whereas in-feed conveyor 14 feeds a stack of pallets from right to left onto the lift table 19. The operator selects which in-feed conveyor 12 or 14 is activated by way of a selector switch 261 (FIG. 7A) on the operator console 26.

Figure 2A:
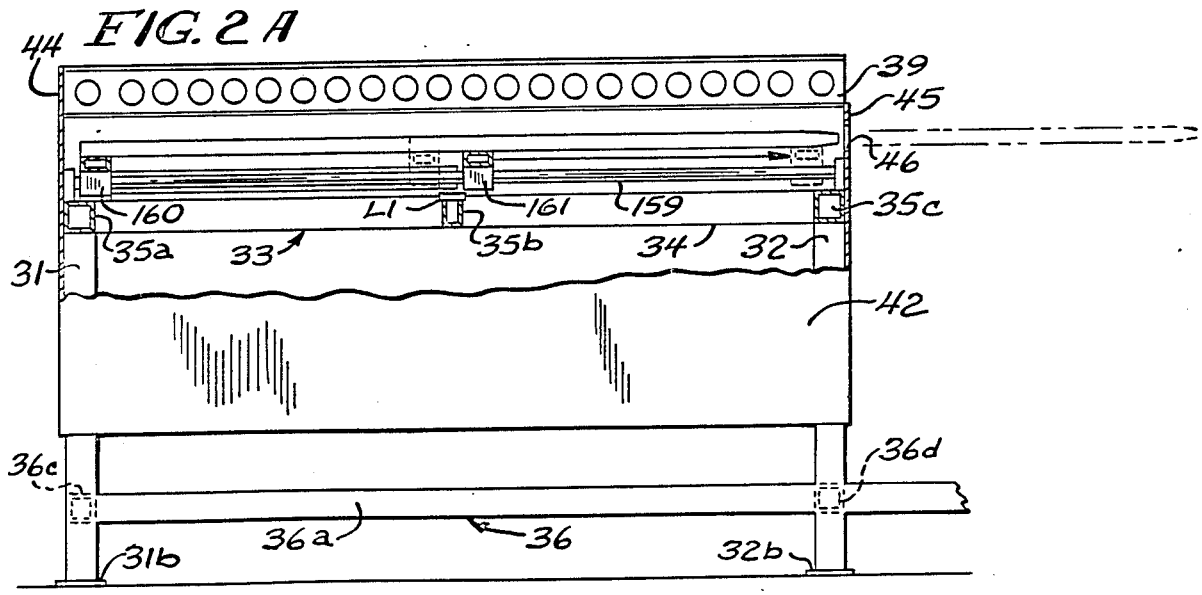
FIG. 2A is a sectional view taken along the line 2A—2A in FIG. 1, illustrating details of an in-feed conveyor and pallet suspension apparatus of the system of FIG. 1.

Referring to FIGS. 1, 2 and 2A, the in-feed conveyor 12, shown in sectional view in FIG. 2A, is symmetrical about its longitudinal axis and includes a pair of rear legs 31, 31a, a pair of front legs 32, 32a (FIG. 3), which are interconnected near their upper ends by a rectangular frame 33 and near their lower ends by a rectangular frame 36. Upper frame 33 includes two longitudinally extending side members, such as side member 34, and three transverse cross members 35a, 35b and 35c. Lower frame 36 includes two longitudinally extending side members 36a and 36b (FIG. 1) and transverse members 36c and 36d (FIG. 2A). Each leg is provided with a foot, such as foot 32b for leg 32, shown in FIG. 4, which defines a pedestal for resting on the floor.

A pair of mounting rails 38 and 39, mounted on an upper surface the side members, mount bearings for the ends of the rollers 17a, 17b, etc. of roller conveyor 17. The rollers 17a, 17b, 17c, etc. are driven by a motor 40 mounted within the conveyor in-feed 12 and coupled to the rollers by suitable drive means as is known in the art.

A pair of L-shaped side cover plates 42 and 43 attached to the outer surface of the upper frame 33 have a horizontal portion which covers the mounting ends of the rollers 17a, 17b, etc., and a vertical portion extending downward enclosing the upper portion of the in-feed conveyor 12. A panel 44 encloses the inlet side of the in-feed conveyor 12 and a panel 45 encloses the outlet side of the in-feed conveyor 12, defining an enclosure for the fork 21. The panel 45 is provided with a pair of apertures 46 and 47 which permit the tines 21a, 21b of the fork 21 (or tines 22a, 22b of fork 22, FIG. 2) to project into the lift table 19.

The right-hand in-feed conveyor 14 is similar to the in-feed conveyor 12 and will not be described. Corresponding elements of conveyor 14 have been given the same reference numerals as those for conveyor 12 but with a prime notation.

Referring to FIGS. 1, 2, 3 and 4, the lift table 19 includes a base or lower frame 50 including front member 51, side members 52 and 53 and rear member 54. A rectangular table top 55 is supported above the frame 50 by two pairs of scissors linkage, 56 and 56'. Each linkage assembly, such as assembly 56, includes a pair of links 57, 58 which are pivotally connected together by means of a bolt 59 at an intermediate location. Link 57 has a fixed end 57a pivotally connected by a bolt 60 to a bracket 61 welded to frame member 51 and a movable end 57b provided with a roller 62 which rides on a track 64 defined by the inner upper surface of the table top 55. The other link 58 has one end 58a pivotally connected by a bolt 65 to a plate 66 which is secured to the inner surface of the table top 55 and its other end 58b is provided with a roller 69 which rides on a track 70 defined by frame member 51. Linkage assembly 56' is similar to assembly 56 and like elements have ben given the same reference number with a prime notation.

For the purpose of driving the lift table vertically, two hydraulic drive cylinders 71, 71' are provided. A pump 134 mounted beneath the lift table supplies hydraulic fluid under pressure to the cylinders 71, 71' through suitable hydraulic lines (not shown). It is apparent that air cylinders could be employed rather than the hydraulic drive. The cylinder 71 has its butt end 75 pivotally attached to movable end 58b of the member and end 76 of its rod 73 bolted to the link 56 by bolt 78. The other cylinder 71' associated with the linkage 56', is similar to drive member 71 and like elements have been given the same reference number with a prime notation. The cylinders include two solenoids 267, 268 (FIG. 7A) which enable the cylinders to extend or retract their rods to raise or lower the table.

Figure 4:
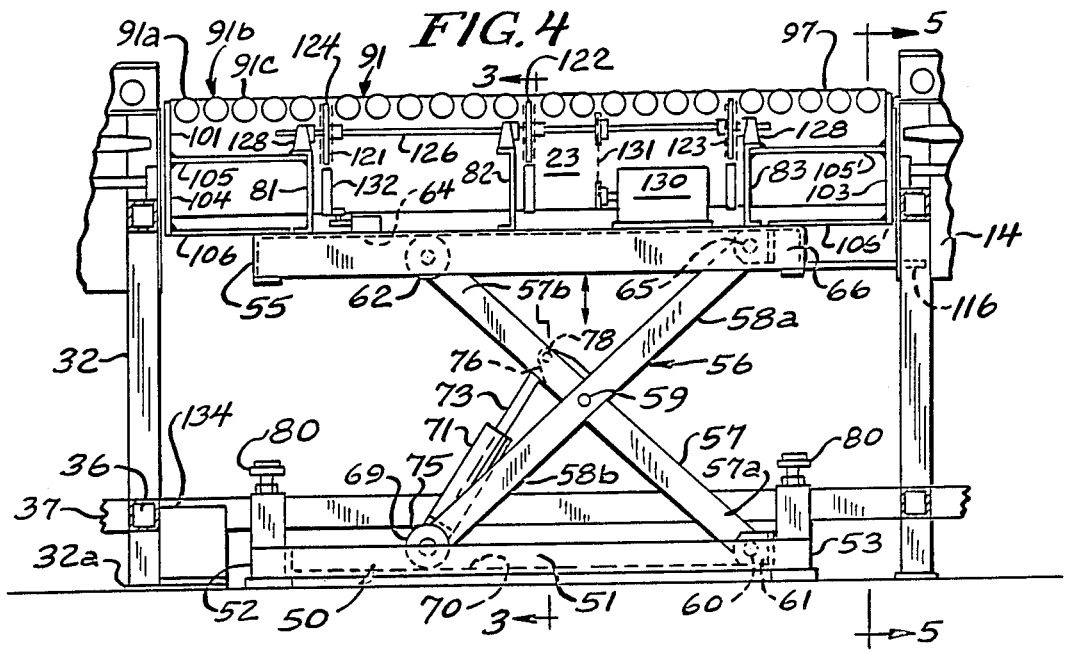
FIG. 4 is a sectional view taken along the line 4—4 in FIG. 2, illustrating details of the lift table of the system shown in FIG. 1.

When the two hydraulic cylinders 71 and 71' are actuated and their rods 73, 73' are extended, the cross link members 57 and 58 (57' and 58') are driven upwardly relative to their fixed mounts 61 and 61' driving their movable ends at rollers 62 and 69 toward the right in FIG. 4, raising the table top 55 relative to the base. When the cylinder rods 73, 73' are retracted, rollers 62 and 69 (62', 69') are driven toward the left in FIG. 4, lowering the table top. Cushions 80 limit downward movement of the table top 55.

Figure 3:
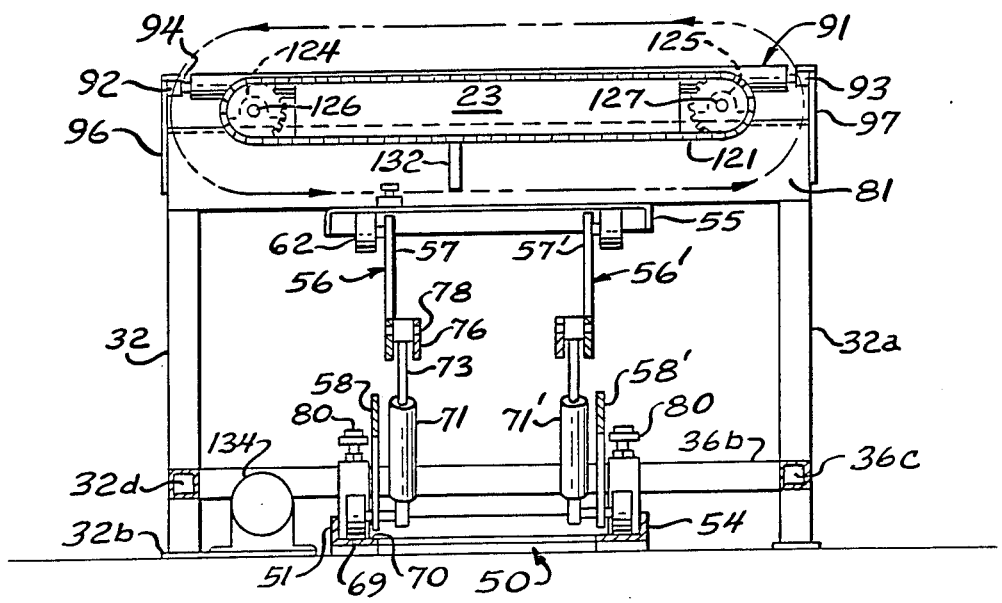
FIG. 3 is a sectional view taken along the line 3—3 in FIG. 2, illustrating an output conveyor of the system of FIG. 1.

Referring to FIGS. 3 and 4, table top 55 of the lift table 19 carries lift conveyor 91 and the pallet discharge conveyor 23 which are supported on three channel members 81-83. The lift conveyor 91 comprises a roller conveyor including a plurality of rollers 91a, 91b, etc., each supported at both ends by bearings 92, 93. A drive gear 94, provided at one end, is driven by a reversible electric drive motor (not shown), the direction of rotation which is correlated with selection of the left-hand in-feed conveyor 12 or the right-hand in-feed conveyor 14 such that the conveyor rollers 91 are driven in the same direction of the rollers of the selected in-feed conveyor.

The bearings 92, 93 are supported by side plates 96 and 97, shown in FIG. 3, which extend along the forward and rearward sides of the lift table assembly 19 and are attached to channel members 81-83 carried the lift table.

Figure 5:
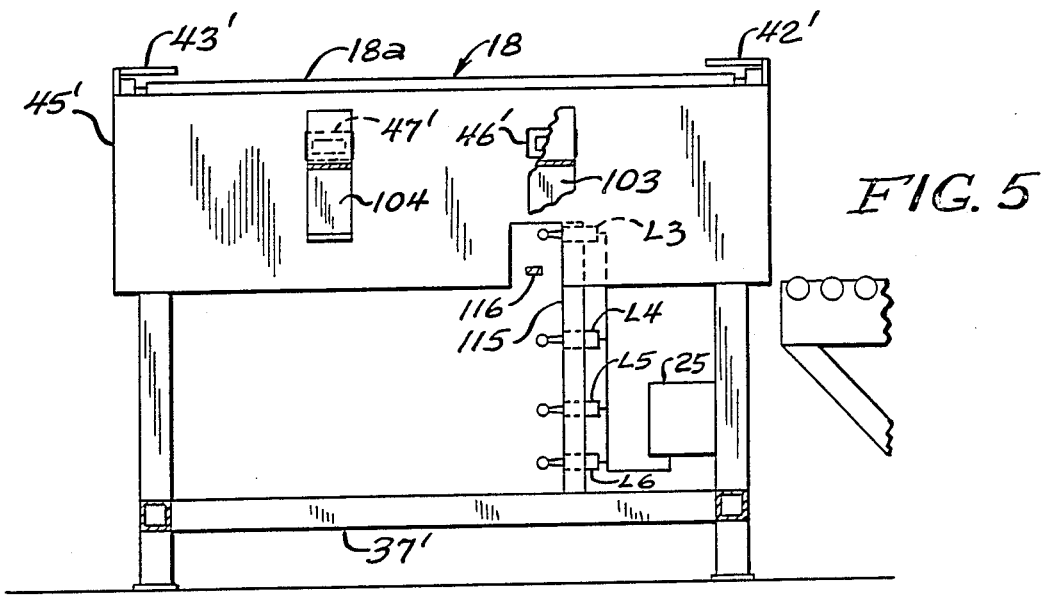
FIG. 5 is a sectional view taken along the line 5—5 of FIG. 4.

Referring to FIGS. 4 and 5, for the purpose of preventing extension of the forks when the lift table is at pallet transfer height, four guard plates 101-104 are provided, one for overlying each of the apertures 46, 47 (FIG. 2) and 46', 47' (FIG. 5) when the top surface of the lift table is above these apertures. The guard plates 101-104 are carried by the lift table 19, extending downward from the top thereof. Each guard plate is carried by a pair of horizontally extending plates, such as plates 105, 106, for guard plate 101 which covers aperture 46, plates 105, 106 extending in parallel spaced relation, plate 105 welded to beam 81 and plate 106 welded to table top 55. Similarly, guard plate 103 which covers aperture 46' is attached to horizontal plates 105', 106' which support guard plate 103 at the right edge of the lift table 19. Plate 105' has one end welded to beam 83 and its other end welded to the plate 103 near its upper edge. Plate 106 is welded to the table top 55 at one end and has its other end welded to plate 103 near its bottom edge. Guard plates 102 and 104 are similarly attached to the lift table, supported to overlie apertues 45 and 45'. Guard plates 101–104 prevent damage to the discharge conveyor 23 carried beneath the table top, should the forks 21, 22 be engaged while the lift table 19 is in its fully raised position.

Referring to FIGS. 2–4, the pallet discharge conveyor 23 comprises three drive chains 121, 122 and 123 which extend transverse to the direction of the in-feed conveyors 12, 14. Each chain is driven by a pair of sprocket wheels, such as sprocket drive wheels 124 and 125 (FIG. 3), for chain 124. The drive wheels are supported on shafts 126–127 mounted in bearings 128. Bearings 128 are supported on channel members 81–83. The shaft 125 is coupled to the a drive motor 130 by a suitable drive 131 (FIG. 4), the drive motor 130 being carried by the lift table. The drive motor 130 is a reversible electric motor which enables the drive chains to be driven in a forward direction (represented by the dashed line in FIG. 3) to drive pallets off the front end of the lift table, or in the reverse direction, enabling pallets to be driven off the rear edge of the lift table when pallet receiving apparatus is provided thereat. Activation of the motor 130 is done by operating a switch, embodied as a foot switch 134 (FIG. 1) located beneath the inspection table. The controller 25 prevents energization of the motor 130 unless the system is operating in automatic mode, and the lift table is at pallet discharge height. The selection of direction of discharge pallets from the lift table is made by the operator via the operator console 26 which is adapted to include a selector switch (not shown) for this purpose.

The drive chain 125 (and drive chains 126–127) carries a lug 132 which is aligned with the operating arm of limit switch L7 which is mounted on the top surface of the lift table. As the chain is driven, lug 132 makes one complete revolution and is driven to engage the back end of a pallet (not shown) present on the lift conveyor. Then with continued driving of the chain, the pallet is pushed towards the left in FIG. 3, off the lift conveyor and onto the pallet inspection table 15 (FIG. 1). With continued driving of the chain, the lug 132 engages and operates limit switch L7, effecting deenergization of the drive motor 130 when the chain has made one complete revolution.

Referring to FIG. 5, as the lift table is driven vertically up and down during pallet destacking operations, limit switches L3–L6 are operated to indicate the height of the table. The limit switches L3–L6 are mounted on a mast 115 which extends vertically upward from frame member 37' of the right in-feed conveyor 14. The table carries an actuator rod 116 which projects horizontally toward the right hand in-feed conveyor (FIG. 4) and engages the actuators of the limit switches L3–L6 as the table is driven up and down.

Switch L3 is actuated when the table is at a pallet transfer height, the fully extended position for the table. Switch L4 is actuated when the table is at a pallet stack pick-up height. Switch L5 is actuated when the table is at a tines out height. Switch L6 is actuated when the table is a the pallet discharge height, the retracted position for the table. Switches L3 and L4 are operated only when the table is driven upwards whereas switches L5 and L6 are operated only as the table is driven downwards.

Referring now to FIGS. 2, 2A, 2B and 2C, the forks 21 and 22, which support a stack of pallets above the lift table during a destacking operation, are supported within the enclosure defined by the in-feed conveyors 12 and 14, at the left and right sides of the lift table 19. Because both forks 21 and 22 are constructed, supported and driven in the same manner, only fork 21 will be described.

Figure 2B:
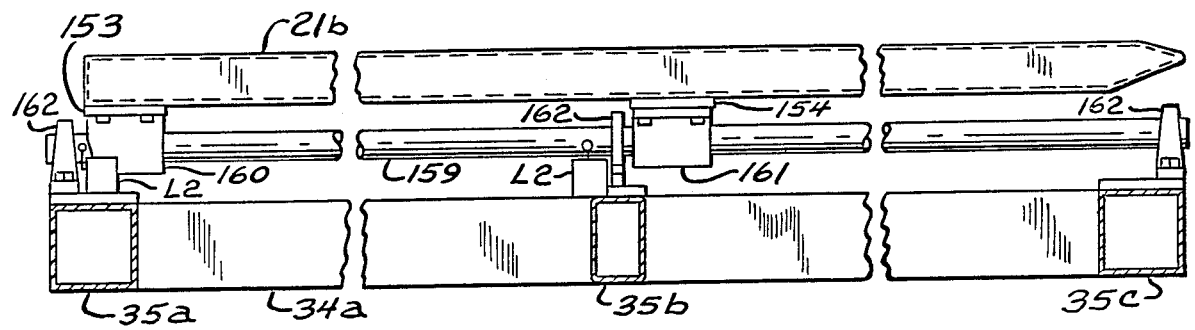
FIGS. 2B and 2C are enlarged views illustrating the mounting arrangement for the suspension apparatus shown in FIG. 2A.
Figure 2C:
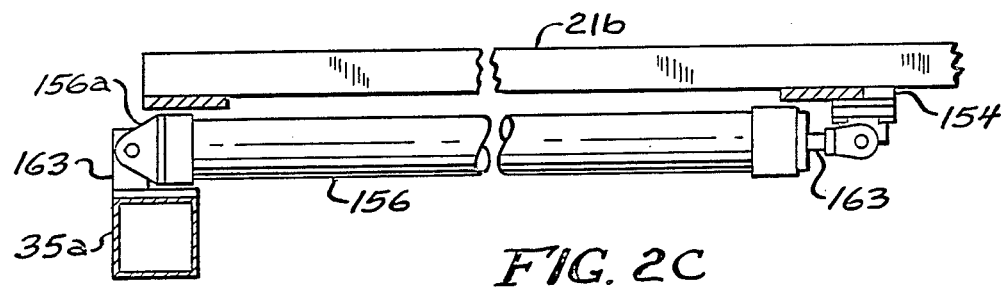

Fork 21 includes tines 21a, 21b which extend the length of the in-feed conveyor 12 and are joined together at the rearward end thereof by a cross brace 153 and at the mid point by a cross brace 154. The fork 21 is driven from a home or retracted position, shown in FIG. 2, to an extended position represented by the dotted line in FIG. 2 by pneumatic (or hydraulic) drive including a drive assembly 156 adapted for connection to a source of air (or hydraulic fluid) under pressure. As best shown in FIG. 2B, tine 21b is supported on a shaft 159 by a pair of bearings 160 and 161, the shaft being supported by guide members 162 mounted on members 35a, 35b and 35c of the in-feed conveyor frame. Similarly, tine 21a is supported and guided on a further shaft (not shown) by like guide bearings (not shown). With reference to FIG. 2C, the drive rod 163 of the drive assembly 156 is connected to the undersurface of cross brace 154 and the butt end 156a of the cylinder is connected to a plate 163 which is attached to member 35a. In one embodiment of the pallet destacker apparatus which was constructed, the drive assembly 156 included for each fork drive a dual-valve pneumatic valve assembly commercially available from MCA as unit 6241A-211-PM-11-1-D, which controls application of an underpressure to an air cylinder such as the commercially available from BIMBA Manufacturing. Each valve assembly has two solenoids (269, 271, 270, 272, FIG. 7A) individually energizable to drive the fork 21 (or 22) between retracted and extended positions.

As indicated, the tines 21a and 21b, shown in the home or TINES IN position, are extendable when the cylinder 156 is activated driving its rod 163 to an extended position or TINES OUT position indicated by the dashed line in FIG. 2A. When the tines are driven from the TINES IN position to the TINES OUT or fully extended position limit switch L1 which is mounted on member 35b (FIG. 2B), is operated by the forward end of the tine 21a. When the tines are driven back to the home position, limit switch L2, which is mounted on member 35a (FIG. 2B), is activated by the back end of the tine 21a. The tines 21a and 21b extend through apertures 46 and 47 when extended and tines 22a and 22b extend through apertures 45' and 46' (FIG. 5) in side plate 35' of the right-hand in-feed conveyor 14 when driven to the TINES OUT position. When the tines are extended, the support members 160, 161 (FIG. 2A) provide support for the forks near the center and at the rearward end thereof. It is pointed out that the tines 21, 22, do not lift the pallets. The lift table 19 moves the pallets downwardly from the STACK TRANSFER height or from the STACK PICK-UP height to the TINES OUT height. The tines are driven into the stack after it has been positioned where it will be suspended by the tines. The lift table moves the stack of pallets. The tines only suspend a stack of pallets and are driven in a horizontal plane. This not only enables the tines to be long enough to support the pallets over nearly the entire width thereof, but also eliminates the need to subject the tines to dynamic forces as would be the case if the forks were used to lift or move the pallet stack.

Figure 6:
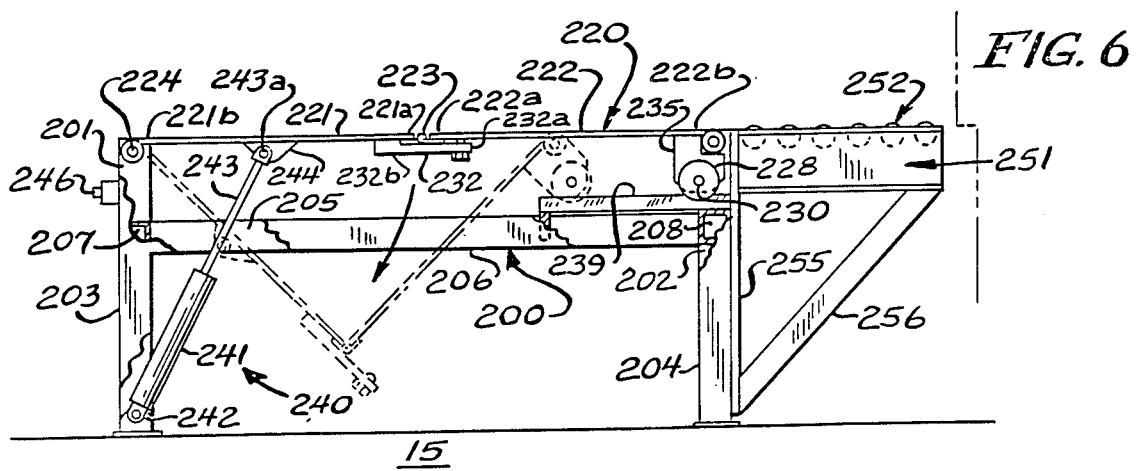
FIG. 6 is a side view of the inspection table of the system of FIG. 1.

Referring now to FIGS. 1, 2 and 6, the pallet inspection table 15 comprises a rectangular frame 200 supported on four legs 201-204. The frame 200 includes four channel members 205, 206, 207 and 208. Frame members 205 and 206 extend horizontally along the sides of the table between and connected to legs 201 and 202, and 203, 204, respectively. Frame members 207 and 208 (FIG. 6) extend along the front and rear edges of the table, respectively, interconnecting leg pairs 201, 203 and 202, 204, respectively.

The table top 220 includes two generally rectangular plates 221 and 222 which are hingedly connected by way of a piano hinge 223 along abutting edges 221a, 222a thereof. The opposite edge 221b of plate 221 is pivotally fixed to the front end of the table by way of a shaft 224 which is journaled in bearings 225 and 226 carried by the upper end of legs 201 and 203, respectively. The rear edge of the table defined by edge 222b of sheet 222 is movably mounted to the frame by way of a pair of v-track wheels 228 and 229 carried on shaft 230 which is fixed to the edge 222b of the sheet 222 by way of mounting plate 235 for wheel 228. The wheels such as wheel 228 ride in a correspondingly shaped track 239 secured to the upper surface of lower frame member 205 at the rearward end thereof, a track extending forwardly from the rear leg 202 approximately one-third the length of the side rail 205. A travel limit arm 232 has one end 232a secured to the undersurface of plates 222 near its inner edge 222a. The other end 232b extends beneath plate 221 and engages the undersurface of the plate 221 and limit upward travel of the plates as they are driven from the pallet inspection position to the pallet receiving position. In the illustrated embodiment, the table top sections comprise plate members. However, the table top could also comprise a pair of roller conveyors or a pair of ball conveyor assemblies.

For the purpose of driving the table between its pallet receiving position and its inspection position, there are provided a pair of pneumatic drive assemblies, such as a drive assembly 240 including a cylinder 241 shown in FIG. 6, are provided, one at each side of the table. The cylinders are adapted to connect to a source of air under pressure. Cylinder 241 has its butt end 242 connected to the base of leg 201 and the end 243a of its rod 243 connected by way of a pivot pin 245 to connector plate 244 extending from the under side of plate 221 by way of a pivot pin 245. An operate switch is 246 mounted in front right leg 203 near the top thereof, for activating the cylinders. When the cylinders are activated, the cylinders remain operated for approximately five seconds, and then restore the table to its pallet receiving position. In one embodiment which was constructed, the drive assembly included a single coil valve commercially available from MAC as the type 180023-112-0001 and an air cylinder.

In its extended position, rod 243 maintains table top in its pallet receiving position, with plates 221 and 222 extending coplanar. In its retracted position rod 243 draws the forward plate 221 downward, pivoting the plates 221 and 222 at the hinge 223 to the position shown by the dashed line in FIG. 6 which defines the pallet inspection position. As the cylinder rod 243 is retracted, forward plate 221 rotates about pivots 225 and 226 while the free end 222b of plate 222 moves forwardly with wheel 228 riding along the track 239 (and wheel 229 riding along its track), allowing the plates to fold to define a cradle for the pallet carried by the table.

The length "M" of the forward plate 221 (FIG. 1) is less than the length "N" of the rear plate 222 to minimize the reach of the operator in turning a pallet over.

Figure 6A:
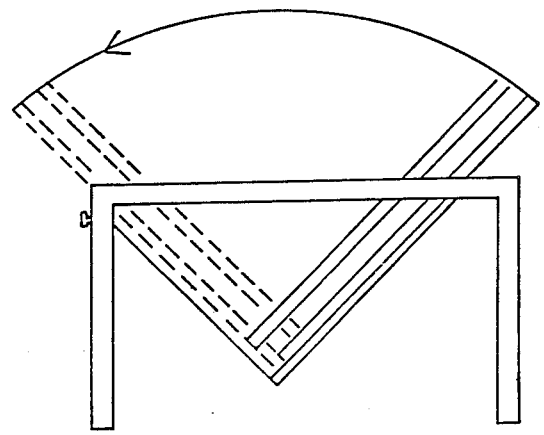
FIG. 6A is a simplified representation of the inspection table, showing the orientation of a pallet after the table top has been operated to its folded position.

When the table is operated to the pallet inspection position, a pallet positioned on the table top is up-ended (see FIG. 6A). The operator can pivot the pallet manually about its lower end to inspect or repair the pallet. The pallet can be pulled toward the operator to the position represented by the dashed lines in FIG. 6A and the table powered back up to its pallet receiving position. The pallet can easily be "flipped" over by the operator without the operator having to lift the pallet. This minimizes noise and virtually eliminates stirring up dust and dirt while enabling the operator to inspect both top and bottom surfaces of a pallet or to turn a pallet over whenever necessary.

An input conveyor 251 may be provided at the pallet receiving edge of the table. The input conveyor comprises a plurality of conveyor rollers 252 supported on a pair of channel members 253, 254 which extends from an upright channel member 255 adapted to be removably attached to the legs 202 and 204 at the rearward edge of the table. A cross brace members 256 provide additional support. One or more output feed rollers (not shown) may be provided along the sides of the inspection table to facilitate transfer of a pallet after inspection to the stacker 16 at the right-hand side of the table or to a pallet transport conveyor (not shown) or the like at the left-hand side of the table.

Referring to FIG. 1, the pallet stacker apparatus 16 may be similar to that disclosed in U.S. Pat. No. 4,273,490, which patent is incorporated herein by reference. Accordingly, the stacking apparatus 16 will not be described herein.

Control Circuits

Figure 7:
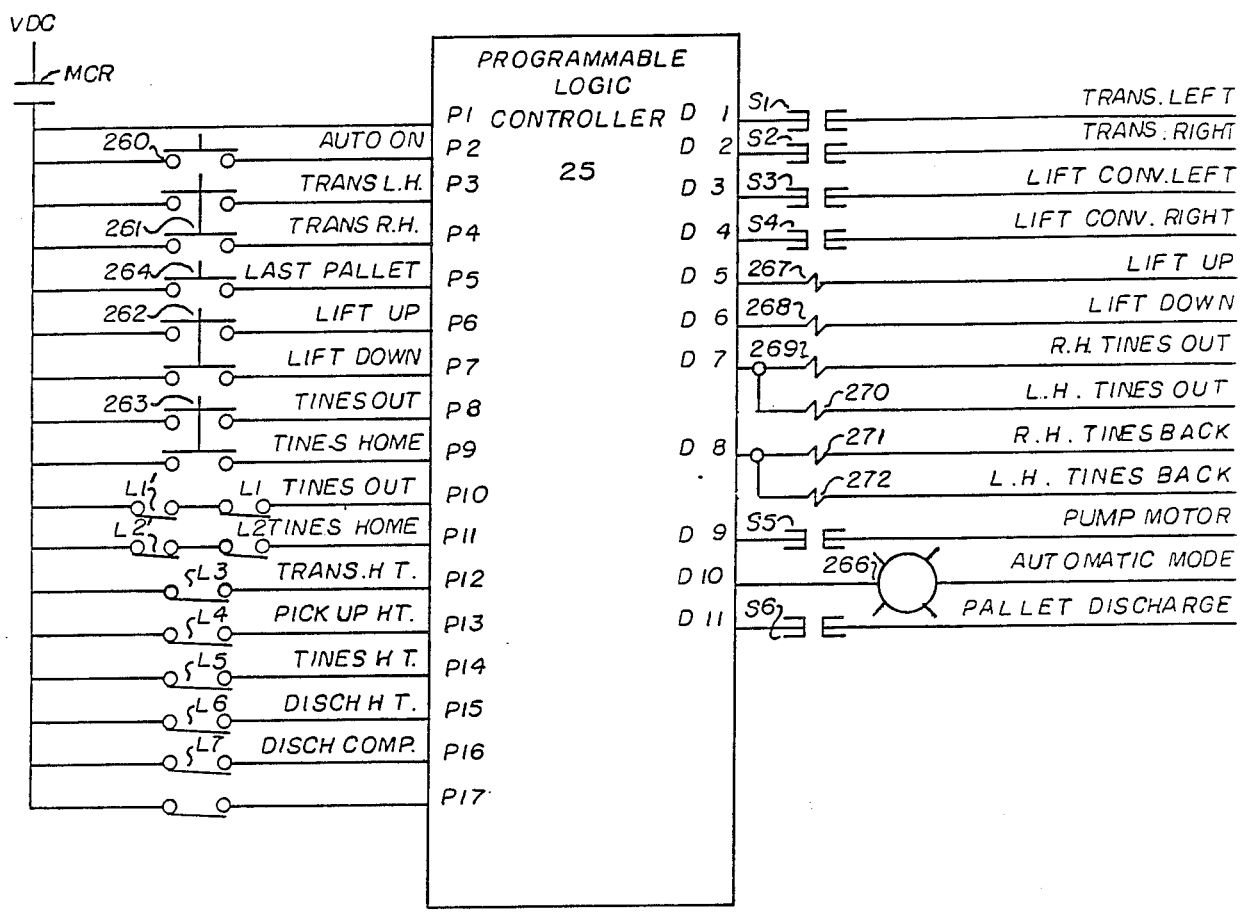
FIG. 7 is a block diagram representation of the process controller illustrating its inputs and outputs.

Referring to FIG. 7, the programmable logic controller 25 which controls the destacker apparatus 11 receives power on a first input P1, eight inputs P2-P9 from the control panel on the operator console 26, seven inputs P10-P16 from the seven limit switches L1-L7, and an input from discharge enable switch 134. The controller 25 provides outputs over eleven output lines D1-D11 for controlling drive motors, cylinder solenoids, the pump motor of the apparatus 11, and the automatic mode indicator lamp 266.

Figure 7A:
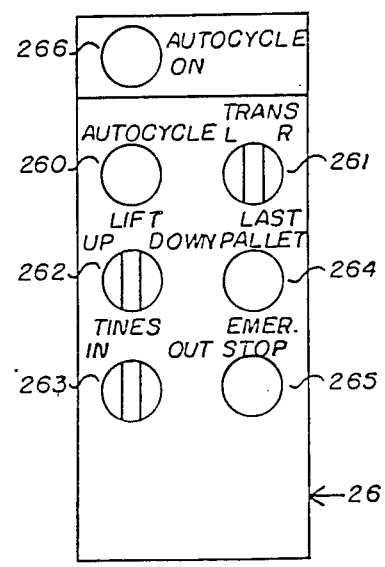
FIG. 7A illustrates the operator console.

Referring to FIG. 7A, the operator console 26 mounts six operating switches 260-265, which enable manual control of the destacking apparatus 11. The automatic mode indicating lamp 266 is also mounted on the control panel.

Autocycle switch 260 activates automatic mode for the destacker apparatus. IN-FEED switch 261 selects left in-feed conveyor 12 or right in-feed conveyor 14. LIFT switch 262 energizes the lift table drive cylinder to drive the table up or down. TINE switch 263 operates the drive cylinders for both forks 21, 22 to drive the forks out or back to home position. LAST PALLET switch 264 is after the last pallet has been discharged from the apparatus, and causes the lift table to be returned to the pallet transfer height. STOP switch 265 is an emergency stop switch for deactivating a master control relay (not shown) to disconnect power from the apparatus. More than one such switch may be provided, different ones of the emergency stop switches being located at different points on the apparatus.

More specifically, the control system is energized when master control relay (not shown) is operated, closing contacts MCR applying power input P1 of the programmable logic controller 25 and to the switches and to the output control lines. Input P2 is activated when the AUTOCYCLE switch 260 is operated. Input P3 and input P4 are controlled by in-feed conveyor transfer IN-FEED switch 261 on the control panel, input P3 being activated when the switch is operated to the left position and input P4 being activated when the switch is operated to the right position. Input P5 is activated when the LAST PALLET switch 264 is depressed. Input P6 is activated when the LIFT switch 262 is operated to the lift up position and input P7 is activated when the LIFT switch 262 is operated while in the lift down position. Input P8 is activated when the tines control TINES switch 263 is set to the tine back position and input P9 is activated when the switch TINES 263 is set to the tines out position.

Input P10 is activated when limit switches L1 and L1' are operated when the tines have been driven to the fully extended position. Input P11 is activated when limit switches L2 and L2' are activated when the tines have been driven back to the home position. Input P12 is activated when limit switch L3 operates when the lift table has been driven up to the stack transfer height. Input P13 is activated when limit switch L4 is operated when the lift has been driven up to the stack pickup height. Input P14 is activated when limit switch L5 is operated when the lift has been driven down to the tines out height. Input P15 is activated when the limit switch L6 is operated indicating the lift table has reached the pallet discharge height. Output P16 is activated when limit switch L7 is operated indicating discharge of a pallet by discharge conveyor has been completed. Output P17 is activated when the operator operates switch 134 to energize the discharge conveyor. If desired, pallet discharge can be done automatically in response to the operation of limit switch 17 when the lift table reaches the PALLET DISCHARGE height.

Turning now to the outputs of the programmable logic controller 25, outputs D1 and D2 operate respective contactor switches S1 and S2 which energize the in-feed conveyor drive motors, such as motor 40 (FIG. 2) for the left in-feed conveyor 12 and the motor (not shown) for the right in-feed conveyor 14, respectively. Outputs D3 and D4 activate contactor switches S3 and S4 for operating the lift table conveyor motor (not shown) in the opposite direction to provide right direction or left direction drive for the lift conveyor rollers, depending upon whether the left or right in-feed conveyor is activated. Output D5 energizes the drive up solenoid 267 for the lift table to drive the table in the upward direction and output D6 activates the lift table drive down solenoid 268 for the lift table. Output D7 activates the fork tines out air cylinder solenoids 269, 270 to cause the cylinders to drive the tines out. Output D8 activates the tines back air cylinder solenoids 271, 272 to cause the cylinders to drive the tines back to the home position. Output D9 activates the compressor pump motor 134 (FIG. 4) for the hydraulic compressor which is mounted beneath lift table 19. Output D10 activates the automatic mode indicator lamp 266. Output D11 activates contactor switch S6 for energizing the pallet discharge motor 130.

Figure 8:
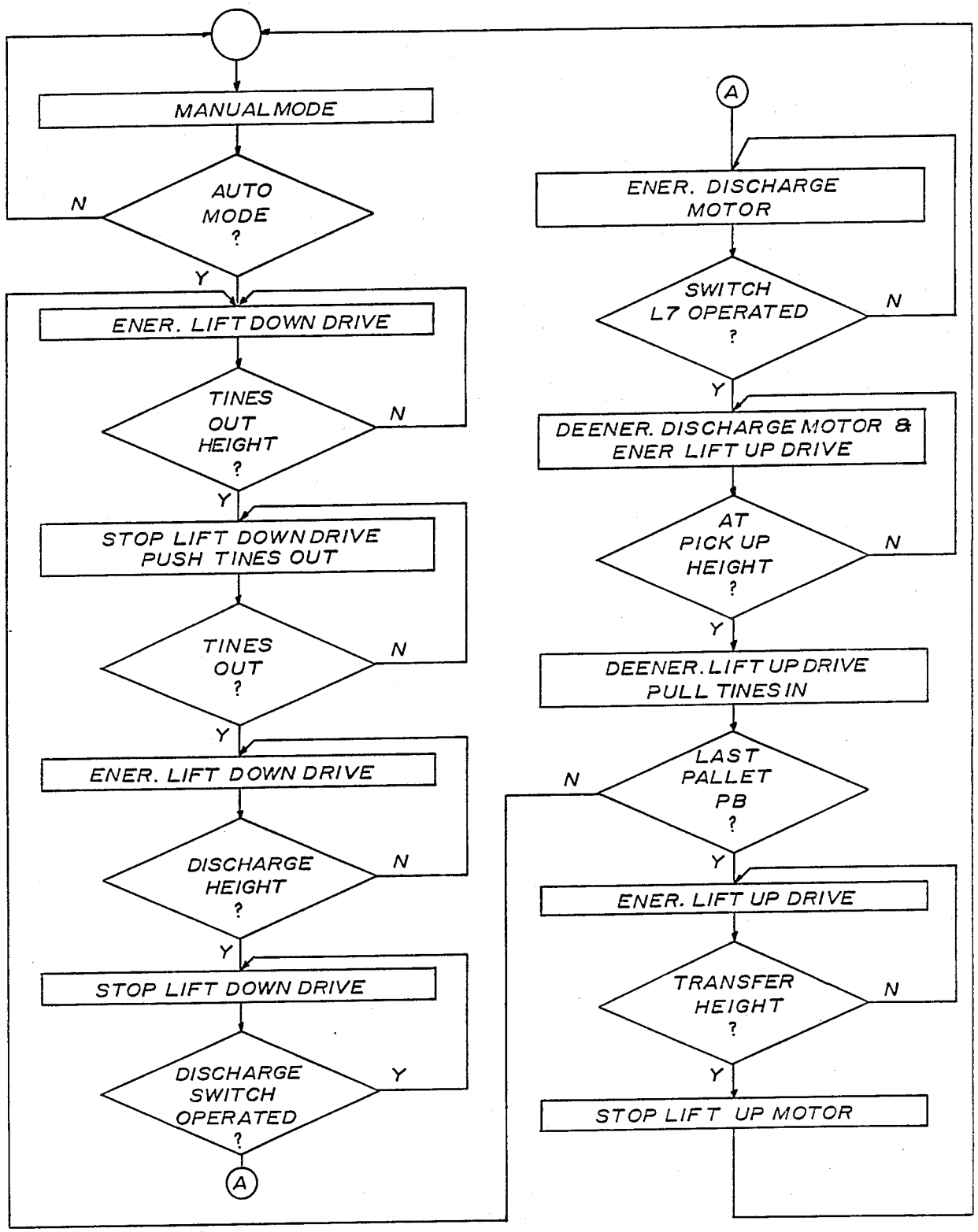
FIG. 8 is a process flow chart illustrating the operation of the pallet inspection and repair system of FIG. 1.

The programmable logic controller 25 operates under program control to respond to the inputs P1-P17 and provide appropriate outputs D1-D11 for controlling the operation of the apparatus 10. FIG. 8 is a process flow chart illustrating the operation of the programmable logic controller 25 during a depalletizing operation. FIGS. 9-15 illustrate, schematically, the operation of the pallet lift table during a sequence of depalletizing operations.

Referring to FIGS. 8 and 9, the system is initially operable in a manual mode during which mode the stack of pallets 300 is transferred from the in-feed conveyor 12 or 14 to the lift table. Stack transfer motions are executed in manual mode only. While the system is in the manual mode, the lift table 19 can be driven up or down by operating switch 262 (FIG. 7A) to the appropriate position. Also, the tines can be driven in or out by operating switch 263 to the appropriate position.

After the stack of pallets 300 has been centered on the lift table, the operator depresses the push button AUTOCYCLE 260 (FIG. 7A) momentarily to place the system in automatic mode. The system is "latched" in the automatic mode under software control and control lever is to manual mode when the push button LAST PALLET 264 is depressed.

The first operation in automatic mode is to energize the lift down drive causing the lift table 19 to be driven down to the TINES OUT height. When the TINES OUT height is reached, the lift down drive is stopped and the tines 21, 22 are driven out to suspend the pallets 302-305. When the tines are fully extended, the lift down drive is reenergized enabling the lowermost pallet 301 to be carried down to the PALLET DISCHARGE height while the remaining pallets 302-305 in the stack are suspended by the tines. When the lift table has been driven down to the PALLET DISCHARGE height, the lift down drive is deenergized and the discharge drive motor 130 is energized under operator control, driving the chain conveyor 124, etc. to drive the lugs into engagement with the pallet 301, and drive the pallet from the lift table. When limit switch L7 is operated by the chain lug, indicating that the pallet has been discharged from the lift table, the discharge motor 130 is deenergized and the table lift up drive is energized allowing the table to be driven to the PALLET PICK-UP height. When the lift table reaches the PALLET PICK-UP height, limit switch L4 is operated and the lift up drive is deenergized and the tines are retracted. A check is then made to determine if the LAST PALLET switch 264 (FIG. 7A) has been depressed and if not, the program loops back to energize the lift down drive to lower the next pallet 302, separating it from the stack of pallets 303-305. On the other hand, if the LAST PALLET push button 264 (FIG. 7A) has been depressed, then the lift up drive is energized to drive the lift table to PALLET TRANSFER height. When PALLET TRANSFER height is reached, the lift up drive is deenergized and the program loops back to the manual mode entry for in feed of a further stack of pallets.

More specifically with reference to FIGS. 7 and 9, when the lift table 19 is at STACK TRANSFER height, the vertical stack 300 of pallets can be fed in from either the left-hand pallet in-feed conveyor 12 or the right-hand pallet in-feed conveyor 14 to the lift table 19. The operator selects the in-feed conveyor 12 or 14 by operating the select switch 261 on the control console 26 (FIG. 7A). Assuming for example that in feed conveyor 12 has been selected, the operator operates TRANSFER switch 261 (FIG. 7A) to the transfer lift position. The controller 25 operates contactor S1 to energize conveyor motor 40 (FIG. 2). The stack of pallets on conveyor 12 is transferred to the lift conveyor 91 under the control of the operator who via switch 261 on the control console 26 can move the stack left or right to center the stack. When the stack of pallets 300 is positioned on the lift conveyor 91 and centered, the operator transfers operation to automatic mode by depressing the AUTOCYCLE push button 260 (FIG. 7A).

Figure 15:
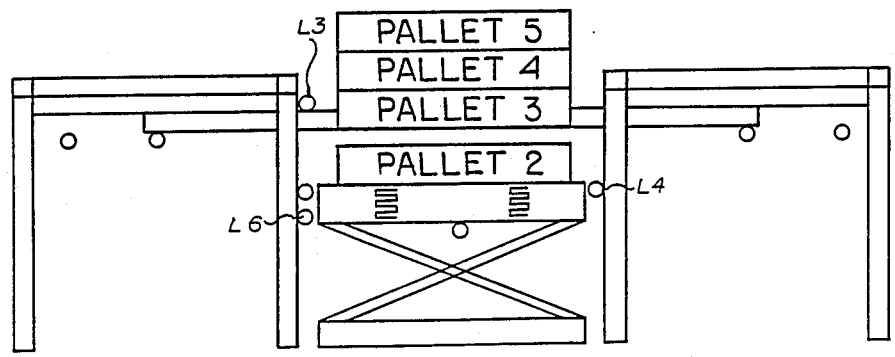

Referring to FIG. 10, when the switch 260 (FIG. 7A) is operated activating input P2, the controller 29 activates output 268 and the lift table is driven down until the lift table reaches the TINES OUT height at which height limit switch L5 is operated actuating input P14. At such height, the openings between stringers of the second lowest pallet 302 of the stack 300 is in line with the tines. The controller responds to input P14 to deactivate output 268 and to energize output D7 energizing tines out drive solenoids 269 and 270. The tines are then driven out and limit switches L1 and L1' are activated when the tines are fully extended activating inputs P10. To simplify the drawings, the tines are shown in FIGS. 11, 12 and 15 to extend only part way into the pallet openings when fully extended. As indicated, in practice opposing ends of the tines are located about four inches apart when at the TINES OUT position. The pallets 302-305 are suspended above the lift table and the lowermost pallet 301.

When switches L1 and L1' are operated, the controller 25 responsively activates output D6 energizing the lift table drive solenoid 268 to lower the lift table 19 to the PALLET DISCHARGE height (FIG. 11). When the lift table reaches the PALLET DISCHARGE height, limit switch L6 is operated activating input P15. The controller responsively deenergizes the lift table drive solenoid 268. When limit switch L6 operates, the conveyor motor drive circuit is prepared for energization when the operator operates switch 134 (FIG. 1). When switch 134 is operated, the discharge conveyor motor 130 is energized under the control of the controller 25, which operates contactor S6, driving the pallet 301 off of the lift table. When the pallet 301 has been discharged, (FIG. 12) limit switch L7 is operated and thus activates input P16. The controller responds and activates output D5 energizing the lift up drive solenoid 267 causing the lift table to be driven upward toward the PALLET PICK-UP height.

Figure 13:
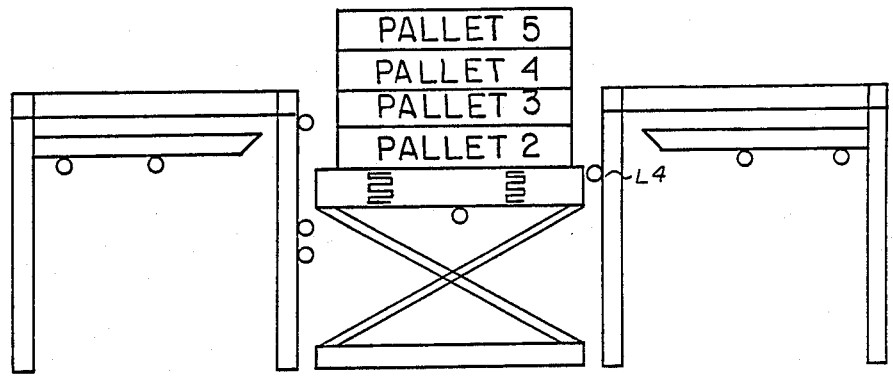
Figure 14:
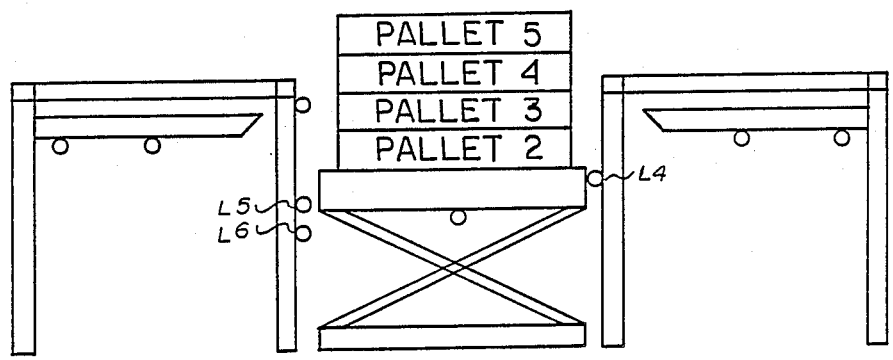

Referring to FIG. 13, when the lift table reaches the PALLET PICK-UP height, limit switch L4 operates activating input P13. The controller responds by deactivating output D5, deenergizing the lift table drive solenoid 267 and activating output D8 energizing the tine solenoids 271, 272 to drive the tines back to the home position. The stack of pallets 302-305 is then supported on the lift table. When the tines reach the home position, limit switches L2 and L2' are operated activating input P11 causing the controller to energize the lift table drive solenoid 268 to drive the table down to the TINES OUT height at which height, the openings between stringers of pallet 303 are aligned with the tines. When the lift table reaches the TINES OUT height (FIG. 14), limit switch L5 is operated, and the controller deactivates the lift down solenoid 268. The controller then energizes tines out solenoids 269, 270 and the tines are driven into the openings between the stringers of the pallet 303. When the tines are fully extended, limit switches L1 and L1' are operated, the controller deenergizing the tine drive solenoids and energizing the lift table drive solenoid 268 to drive the table down toward the PALLET DISCHARGE height, as shown in FIG. 15. When the lift table has been lowered to the PALLET DISCHARGE height, limit switch L6 is operated to enable the controller to respond to deenergize table drive solenoid 268. The discharge conveyor motor is energized to drive the pallet 302 from the lift table when switch 134 is operated by the operator, the controller responding to activation of its input P17 to operate contactor S6.

The sequence continues until the remaining pallets 303-305 have been discharged from the lift table. When the lift table is returned to PALLET PICK-UP height, the tines are driven home or retracted in response to operation of limit switch L4. The operator then depresses the LAST PALLET push button 264 (FIG. 7A), the operation of which activates controller input P5. The controller energizes table lift up solenoid 267 which causes the lift table to be raised to the STACK TRANSFER height. The table is deenergized under controller control when the limit switch L3 is operated in response to the lift table reaching the STACK TRANSFER height. The lift table is then positioned to receive a further stack of pallets from either in feed conveyor 12 or 14. The system automatically reverts to manual mode following operation of the LAST PALLET push button and raising of the lift table to the STACK TRANSFER height. If the table lift drive is energized to drive the table upward from the PALLET PICK-UP height and the tines for any reason, have not been retracted, strain sensors (not shown) mounted on the tines near the ends thereof provide inputs to the controller 25 to deenergize the lift up drive and halt further upward movement of the lift table, if the lift table is driven to engage the tines.

As indicated, the controller 25 operates under program control to operate the destacking apparatus 11. The sequence of controller operations are illustrated in the flow chart given in FIG. 8. In the disclosed embodiment, the destacker apparatus 11 is operated to destack a stack of pallets, dispensing the pallets one at a time to pallet repair and inspection apparatus. With suitable modification of the software for the controller 25, the apparatus 11 can be operated to provide pallet stacking operations in addition to or rather than pallet destacking operations.

In such apparatus, when a pallet is positioned on the lift table, while at the discharge height, the operator operates a switch to drive the lift table to the pallet suspension height to support a stack of pallets, if any, suspended by the forks. The forks are withdrawn and the table is driven to the stack pick-up height, aligning the openings in the lowermost pallet with the forks. The forks are then driven out, suspending the entire stack while the empty table is driven down to the pallet discharge height to receive the next pallet.

Operating Systems

Figure 16:
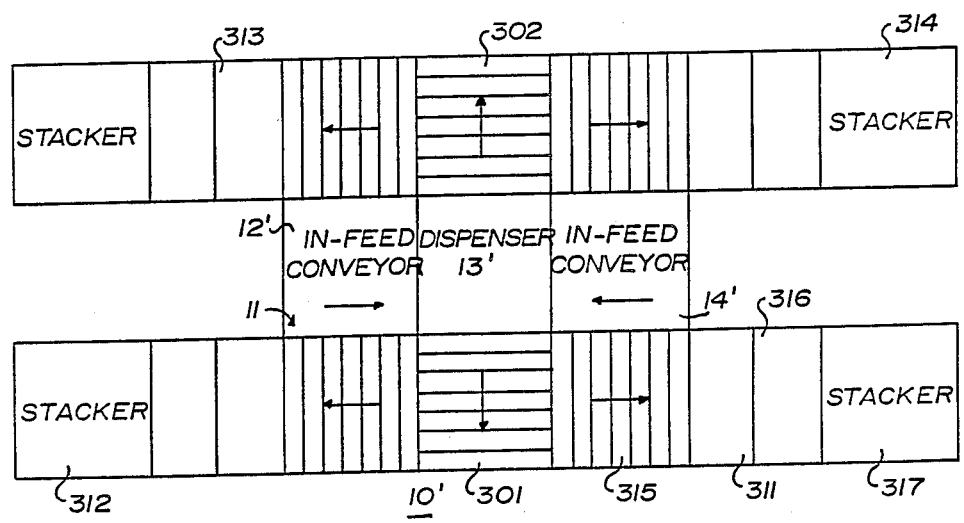

Referring to FIG. 16, there is shown a block diagramatic representation of a modularized pallet sorting/inspection 10' provided by the present invention. The system 10' includes a pallet destacking apparatus 11 including right and left in feed conveyors 12' and 14' and dispenser apparatus 13' similar to units 12, 13 and 14 described above. In this system, both forward and reverse off feed are provided from the pallet dispenser 13. To this end, a pair of transfer roller systems 301 and 302 are provided for transferring pallets from a stack of pallets to one of four inspection stations 311–314. Each station, such as station 311, includes a roller conveyor 315, an inspection table 316, and a pallet stacker 317.

The system 10' increases by four times, the numer of pallets which can be inspected and sorted. The system 10' can be operated in various modes. By way of example, pallets being discharged from the destacker apparatus can initially be discharged to the forward stations 311 and 312, alternately under manual control, the discharged pallets received from the rollers 301 being alternately feed to station 311 and 312, and restacked by stackers 317 after inspection. When the stackers 317 are fully loaded, then, while the stacker 317 are being unloaded, the next series of pallets can be fed to the stations 313 and 314 in a similar manner. Alternatively, pallets from a given stack can be fed through stations 311, and pallets from the next stack can be fed to station 312, etc. The particular operating configuration can be determined as a function of available help, number of pallets to be inspected and sorted, etc. It is apparent, that a preliminary inspection can be made as the pallets are received on the transfer roller 301, with pallets in need of repair being transferred to one station, station 311, for example, and pallets appearing to be usable being transferred to the other station 312.

Figure 17:
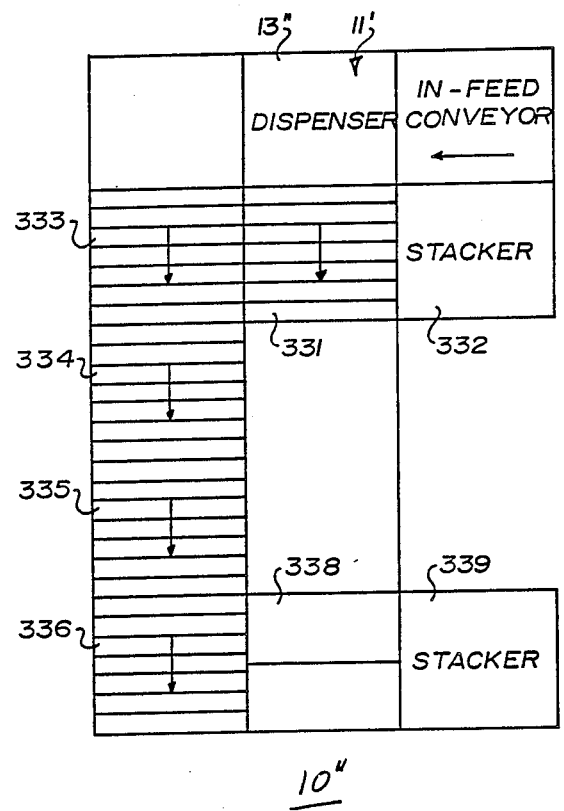

Referring to FIG. 17, there is shown a further system 10". This system utilizes corner space in a factory warehouse, or the like, with the destacker apparatus 11' being located in one corner, and only one in feed conveyor is used. Pallets discharged from the pallet dispenser 13"are fed to a transfer roller 331, manually inspected and fed to a pallet stacker 332 if the pallet is useable. Damaged pallets are fed via a transfer system comprised of four sets of conveyor rollers 333–336 to a repair table 338 where the damaged pallets are repaired prior to being transferred to a further stacker 339.

Because of the modula construction of the pallet repair and inspection sorting systems, various configurations can be provided to suit the needs of a particular application and location.

Having thus disclosed in detail preferred embodiments of the invention, persons skilled in the art will be able to modify certain of the structure which has been illustrated or to substitute equivalent elements for those disclosed while continuing to practice the principles of the invention. It is thus intended that all such modifications and substitutions be covered as they are embraced within the spirit and scope of the appended claims.

We claim:

1. A pallet destacking apparatus comprising: pallet in-feed conveyor means; pallet dispenser means; pallet discharge conveyor means; and control means;

said pallet in-feed conveyor means being aligned in side-by-side relation with said pallet dispenser means and including a frame and roller means rotatably supported on said frame, and conveyor drive means for rotating said roller means to transport a vertical stack of pallets positioned on said roller means into said pallet dispenser means;

said dispenser means including a vertically reciprocating pallet lift means, lift drive means, pallet suspension means and suspension drive means, said lift means receiving the vertical stack of pallets, said lift drive means controlled by said control means to drive said lift means vertically between a pallet stack transfer height at the same horizontal level as the pallet in-feed conveyor means, and a pallet discharge height at a lower horizontal level, said suspension means located at a pallet suspension height at a level intermediate said pallet stack transfer height and said pallet discharge height, said suspension drive means controlled by said control means to cause said suspension means to suspend a partial stack of pallets including the pallets above the lowest pallet of the stack at the pallet suspension height as said lift means is lowered from the stack transfer height to the pallet discharge height whereby only the lowest pallet in the stack is lowered to the pallet discharge height; said discharge conveyor means carried by said lift means and activated by said control means to discharge the pallet lowered to said pallet discharge height from the destacking apparatus.

2. Apparatus according to claim 1, wherein said control means responds to the discharge of a pallet by the discharge conveyor means to control said suspension drive means and said lift drive means to successively raise said lift means to a pallet pick-up height to engage the current lowermost pallet of the partial stack of pallets and lower the lift means to lower the current lowermost pallet of the partial stack to said discharge height for discharge from the destacker apparatus by said discharge conveyor means to thereby discharge the pallets of the vertical stack from the destacker apparatus one at a time.

3. Apparatus according to claim 2, wherein said control means includes process controller means responsive to control signals applied to inputs thereof to control the operation of said lift means and said suspension means, and first and second switch means connected to inputs of said process controller means, means mouunting said first and second switch means adjacent to said lift means for operation thereby to provide a control signal to said process controller means when said lift means reaches said pallet suspension and pallet discharge heights, respectively.

4. Apparatus according to claim 3, wherein said control means includes a third switch means connected to an input of said process controller means and mounted adjacent to said discharge conveyor means and operated thereby to provide a control signal to said process controller means when a pallet has been discharged from the destacking apparatus.

5. Apparatus according to claim 4, wherein said control means includes a fourth switch means connected to an input of said process controller means and mounted adjacent to said lift means for operation thereby to provide a control signal to said process controller means when said lift means reaches said pallet pick-up height.

6. Apparatus according to claim 5, wherein said control means includes fifth switch means connected to an input of said process controller means and manually operable to provide a control signal to said process controller means for causing it to energize said lift drive means to drive said lift means to said pallet stack transfer height.

7. Apparatus according to claim 3, wherein said suspension means comprises first and second horizontally reciprocating forks each having a pair of tines, and means mounting said first and second forks on opposite sides of said lift means at said pallet suspension height, pallets positioned on said in feed conveyor means being aligned in the vertical stack with their stringers extending in the direction of transport, said suspension drive means driving said forks from a home position to an extended position in which the tines of said forks are driven into spaces between stringers of the penultimate pallet of the stack of pallets.

8. Apparatus according to claim 7, wherein said control means includes first and second limit switches connected to inputs of said process controller means and mounted for operation by said first and second forks, respectively, to provide control signals to said process controller means when said forks are at the home position, and third and fourth limit switches connected to inputs of said process controller means and mounted for operation by said first and second forks, respectively, to provide control signals to said process controller means when said forks are extended.

9. Apparatus according to claim 5, wherein said control means includes a fifth switch connected to an input of said process controller means and mounted adjacent to said lift means for operation thereby to provide a control signal to said process controller means when said lift means reaches said pallet pick-up height.

10. Apparatus according to claim 2, wherein said lift means comprises a frame and a plurality of conveyor rollers rotatably supported on said frame and drive means coupled to said conveyor rollers and controlled by said control means for rotating said conveyor rollers in correspondence with said roller means of said pallet in-feed conveyor means.

11. Apparatus according to claim 10, wherein said in-feed conveyor means comprises a first roller conveyor located at one side of said pallet support means and a second roller conveyor located at the opposite side of said pallet support means, each of said roller conveyors having associated drive means connected to said control means and individually selectable to enable a stack of pallets on the selected one of the roller conveyors to be transported onto said lift means.

12. Apparatus according to claim 10, wherein said discharge conveyor means comprises a plurality of drive chains extending between different pairs of adjacent rollers of said lift means and drive means, and each including a lug extending vertically therefrom to engage a pallet positioned on said lift means conveyor rollers and move it thereoff as said drive chains are driven by said drive means.

13. A pallet destacking apparatus for destacking a vertical stack of pallets comprising: pallet dispenser means; pallet discharge conveyor means and control means;
said pallet dispenser means including a vertically reciprocating pallet lift means for receiving the stack of pallets while the lift means is positioned at a pallet transfer height; lift drive means for lowering said lift means vertically from the pallet transfer height to a pallet suspension height at a lower horizontal level, and to drive said lift means vertically between said pallet suspension height and a pallet discharge height at a level lower than said pallet suspension height; pallet suspension means, and suspension drive means; said control means energizing said suspension drive means when said lift means is lowered to said pallet suspension height to cause said pallet suspension means to suspend the pallets above the one of the pallets which is the lowest pallet of the stack at the pallet suspension height while said lift means is driven from said pallet suspension height to said pallet discharge height, and said control means energizing said pallet discharge conveyor means when said lift means is driven to said discharge height to discharge said one pallet carried by said lift means.

14. Apparatus according to claim 13, wherein said control means is enabled following discharge of said one pallet from the apparatus to successively drive said lift means between said discharge height and said suspension height and to control said suspension means each time said lift means is driven to said suspension height to release the lowermost pallet from the suspended pallets onto said lift means to be carried thereby from said suspension height to said discharge height for discharge from the apparatus.

15. Apparatus according to claim 14, wherein said suspension means comprises first and second horizontally reciprocating forks, and means mounting said forks at opposite sides of said lift means, said forks driven by said suspension drive means between a home position and an extended position in which said forks engage openings in the sides of the penultimate pallet of the stack of pallets for supporting said penultimate pallet and pallets stacked thereupon, while said lift means is lowered to a discharge height carrying thereon the lower most pallet.

16. Apparatus according to claim 13, including pallet in-feed conveyor means aligned in side-by-side relationship with said pallet dispenser means at said pallet transfer height and including a frame and roller means rotatably supported on said frame and conveyor drive means for rotating roller means to transport a vertical stack of pallets positioned on said roller means onto said pallet lift means.

17. A pallet destacking apparatus comprising: pallet dispenser means; pallet discharge conveyor means and control means; said pallet dispenser means including a vertically reciprocating pallet lift means; lift drive means for driving said lift means from a pallet transfer height to a pallet suspension height, and to drive said lift means between said pallet suspension height and a pallet discharge height; pallet suspension means, and suspension drive means; said control means energizing said suspension drive means when said lift means is driven to said pallet suspension height to cause said pallet suspension means to suspend the pallets above the one of the pallets which is the lowest pallet of the stack at the pallet suspension height while said lift means is driven from said pallet suspension height to said pallet discharge height, said suspension means including first and second horizontally reciprocating forks, and means mounting said forks at opposite sides of said lift means, said forks driven by said suspension drive means between a home position and an extended position in which said forks engage openings in the sides of the penultimate pallet of the stack of pallets for supporting said penultimate pallet and pallets stacked thereupon while said lift means is lowered to a discharge height carrying thereon the lower most pallet, said control means energizing said pallet discharge conveyor means when said lift means is driven to said discharge height to discharge said one pallet carried by said lift means, and following discharge of said one pallet from the apparatus, said control means operating to successively drive said lift means between said discharge height and said suspension height and to control said suspension means each time said lift means is driven to said suspension height to release the lowermost pallet from the suspended pallets onto said lift means to be carried thereby from said suspension height to said discharge height for discharge from the apparatus, said control means including a process controller means and a plurality of limit switches means said process controller means being responsive to control signals for controlling said lift drive means and said suspension drive means and said plurality of limit switches providing control signals to process controller means for indicating the vertical position of said lift means and the position of the suspension forks, said pallet suspension height being below said pallet stack transfer height and said pallet discharge height being below said pallet suspension height whereby said lift means only lowers pallets in moving the stack from the transfer height to the suspension height, and only lowers the lowermost pallet in moving the lowermost pallet from the suspension height to the discharge height.

18. In a pallet repair and inspection system for inspecting pallets in a vertical stack of pallets including at least first, second and third pallets, a method of dispensing the pallets from the stack one at a time comprising the steps of: moving the stack of pallets to a pallet lift means at a pallet transfer height; lowering the lift means to move the stack of pallets from the pallet transfer height to a pallet suspension height; moving a pallet suspension means into engagement with said second pallet for supporting said second pallet and said third pallet stacked thereon relative to said first pallet and the lift means; lowering the lift means and the first pallet carried thereby to a discharge height to move said first pallet in the stack to the discharge height; operating a discharge conveyor means to discharge said first pallet from said lift means; raising said lift means to a pallet stack pick-up height to reengage the stack of pallets; retracting the pallet suspension means to enable the stack of pallets to be supported on the lift means; lowering the lift means to the pallet suspension height; moving the pallet suspension means into engagement with the third pallet to suspend said third pallet relative to said second pallet and said lift means; lowering the lift means and the second pallet carried thereby to the discharge height; operating the discharge means to discharge the second pallet from the lift means; and repeating the operation, until the stack of pallets has been discharged one at a time.

19. A method according to claim 18, further comprising returning the lift means to the transfer height after the last pallet has been discharged.

20. A method according to claim 18, which further comprises sensing the height of the lift means by means of limit switches, monitoring the limit switches by means of a process controller means and responsively sequencing the operation of the lift means and the suspension means.

21. A pallet inspection table for use with pallet transport apparatus for inspecting the top and bottom surfaces of a pallet, said pallet inspection table comprising: support means; a foldable table top; and actuating means; said support means including first and second side rails extending in parallel spaced relationship and supported above floor level, said table top having a forward edge, a rearward edge, a pair of side edges, and means defining a folding axis which extends between its side edges defining forward and rearward table top portions, fixed mounting means pivotally mounting said forward edge of said table top to said support means between said side rails thereof and movable mounting means mounting said rearward edge of said table top to said support means between said side rails thereof; said actuating means mounted to said support means and connected to said table top for driving said table top portions between first and second positions including a pallet receiving position in which said table top portions extend coplanar to one another in a generally horizontal plane and a pallet inspection position in which said table top is folded along said folding axis and said table top portions extend at an angle relative to one another defining a cradle for one end of a pallet being inspected.

22. A pallet inspection table according to claim 21, wherein said actuating means comprises a fluid actuated drive means including a drive cylinder connected to said support means and a drive rod connected to one of said table top portions and movable between extended and retracted positions for driving said table top portions between said first and second positions.

23. A pallet inspection table according to claim 22, wherein said side rails define a pair of guidance tracks extending therealong at opposite sides of the table near the rearward edge of said table top, said movable mounting means comprising roller means rotatably secured to said table top at its rearward edge and engaging said guidance tracks for movement therealong as said table top portions are driven between said first and second positions.

24. A pallet inspection table according to claim 23, wherein said table top portions comprise first and second plate members and said means defining the folding axis comprises a piano hinge interconnecting adjacent edges of said plate members.

25. A pallet inspection table for use with pallet transport apparatus, said pallet inspection table comprising: support means, a foldable table top, and actuating means; said support means including a generally rectangular frame, first and second side rails and a plurality of legs supporting said frame and side rails above floor level;

said table top including first and second generally rectangular plate members having first and second parallel extending edges, hinge means hingedly connecting together said plate members along said first edges thereof, fixed mounting means pivotally mounting said second edge of said first plate member to said support means, and movable mounting means mounting said second edge of said second plate member to said support means;

said actuating means mounted to said support means and connected to said table top for driving said plate members between first and second positions including a pallet receiving position in which said plate members extend coplanar to one another in a generally horizontal plane and a pallet inspection position in which said plate members are folded along said hinge means and extend at an angle relative to one another defining a cradle for one end of a pallet supported by the inspection table.

26. A pallet inspection table according to claim 25, wherein said actuating means comprises a fluid actuated drive means including a drive cylinder connected to said support means and a drive rod connected to one of said plate members and movable between extended and retracted positions for moving said plate members between said first and second positions.

27. A pallet inspection table according to claim 26, wherein said support means defines a pair of guidance tracks along opposite sides of the table and said movable mounting means comprises roller means rotatably secured to said second plate member near its second edge at opposite sides thereof and engaging said guidance tracks for movement therealong as said plate members are driven between said first and second positions.

28. A pallet inspection table according to claim 27, wherein the length of one of said plate members between its first and second edges is larger than the length of the other plate member between its first and second edges whereby the hinged joint is forward of centerline of said table top.

29. A pallet inspection table according to claim 28, further comprising input conveyor means for receiving and conveying pallets to said table top.

30. A pallet inspection table according to claim 29, wherein one of said plate members includes limit means carried on the undersurface thereof for limiting movement of said plate members relative to another as said table top is driven from the pallet inspection position to the pallet receiving position.

31. In a pallet inspection and repair system, the combination comprising pallet destacking apparatus including pallet in-feed conveyor means; pallet dispensing means; pallet discharge conveyor means having a discharge outlet, and control means;

said pallet in-feed conveyor means being aligned in side-by-side relationship with said pallet dispensing means to transport a vertical stack of pallets positioned on said in-feed conveyor onto said pallet dispensing means;

said pallet dispensing means including a vertically reciprocating pallet lift means; lift drive means for driving said lift means from a pallet transfer height, where said lift means is at the same horizontal level as said in-feed conveyor means, to a pallet suspension height, and to drive said lift means between said pallet suspension height and a pallet discharge height; and a pallet inspection table located at said discharge outlet of said discharge conveyor means and having a pallet receiving table top extending horizontally at said pallet discharge height; said control means energizing said suspension drive means when said lift means is driven to said pallet suspension height to cause said pallet suspension means to suspend a partial stack of pallets including the pallets above the one of the pallets which is the lowest pallet of the stack at the pallet suspension height while said lift means is driven from said pallet suspension height to said pallet discharge height, and said control means energizing said pallet discharge conveyor means when said lift means is driven to said discharge height to discharge said one pallet onto said pallet inspection table with said pallet oriented horizontally, said table top constructed and arranged to fold along a folding axis to define a cradle receiving one end of the pallet being inspected to orient said pallet in a generally vertical direction to permit inspection of top and bottom surfaces of said pallet.

32. A system according to claim 31, wherein said pallet inspection table includes support means and actuating means; said support means including first and second side rails extending in parallel spaced relationship and supported above floor level; said table top having a forward edge, a rearward edge and a pair of side edges and said table top defining a folding axis which extends between its side edges defining forward and rearward table top portions, fixed mounting means pivotally mounting said forward edge of said table top to said support means between said side rails thereof and movable mounting means mounting said rearward edge of said table top to said support means between said side rails thereof; said actuating means mounted to said support means and connected to said table top for driving said table top portions between first and second positions including a pallet receiving position in which said table top portions extend coplanar to one another in a generally horizontal plane and a pallet inspection position in which said table top is folded along said folding axis and said table top portions extend at an angle relative to one another defining said cradle.

33. A system according to claim 32, where said table top portions comprise first and second plate members and said means defining the folding axis comprises a piano hinge interconnecting adjacent edges of said plate members.

34. A system according to claim 32, wherein said actuating means comprises a fluid actuated drive means including a drive cylinder connected to said support means and a drive rod connected to one of said table top portions and movable between extended and retracted positions for driving said table top portions between said first and second positions.

35. A system according to claim 34, wherein said side rails define a pair of guidance tracks extending therealong at opposite sides of the table near the rearward edge of said table top, said movable mounting means comprising roller means rotatably secured to said table top at its rearward edge and engaging said guidance tracks for movement therealong as said table top portions are driven between said first and second positions.

36. A system according to claim 31, wherein said control means responds to discharge of said one pallet onto said inspection table to successively drive said lift means between said discharge height and said suspension height and to control said suspension means to release the lowermost pallet from the suspended partial stack of pallets onto said lift means to be carried thereby to said discharge height for discharge onto said inspection table.

37. A system according to claim 36, further comprising pallet stacking means located adjacent to said inspection table for receiving and stacking pallets discharged onto said inspection table after they have been inspected.

38. In a pallet inspection and repair system, the combination comprising: pallet destacking means, including first pallet in-feed conveyor means, second pallet in-feed conveyor means and pallet dispensing means located between said first and second in-feed conveyor means for receiving a vertical stack of pallets from a selected one of said in-feed conveyor means and having first and second discharge outlets for discharging pallets one at a time over a selected one of said discharge outlets;

first and second pallet transfer means located at said first and second discharge outlets, respectively, said first transfer mean transferring pallets discharged thereto to first and second pallet inspection stations and said second transfer means transferring pallets discharged thereto to third and fourth inspection stations, each of said inspection stations including a pallet inspection table for inverting each pallet transported thereto, and a pallet stacking means for restacking pallets after inspection.

39. In a pallet inspection and repair system, the combination comprising: pallet destacking means, transfer means, and pallet stacking means, said pallet destacking means including pallet in-feed conveyor means an pallet dispensing means for receiving a vertical stack of pallets from said destacking means and having a discharge outlet for discharging the pallets one at a time through said discharge outlet for visual inspection by an operator, said transfer means at said discharge outlet for enabling an operator to transfer undamaged pallets to said pallet stacking means and to transfer damaged pallets to a pallet repair station including conveyor means, a pallet inspection table and further pallet stacking means, said conveyor means transporting pallets from said transfer means to said inspection table for inspection and repair by an operator, and said further pallet stacking means being located at a discharge outlet of said pallet inspection table to enable an operator to transfer repaired pallets from said inspection table to said further pallet stacking means.

40. A system according to claim 39, wherein said conveyor means comprises a plurality of roller conveyors defining a holding station for pallets prior to transfer to said inspection table.

* * * * *

UNITED STATES PATENT AND TRADEMARK OFFICE
CERTIFICATE OF CORRECTION

PATENT NO. : 4,743,154
DATED : May 10, 1988
INVENTOR(S) : Raymond E. James and Donald Karner It is certified that error appears in the above—identified patent and that said Letters Patent is hereby corrected as shown below:

Column 16, line 36, "mouunt-" should be --mount- --;

Column 18, line 32, after "rotating" insert --said--;

Column 19, line 5, after "switches" delete --means--;

Column 21, line 29, after "conveyor" insert --means--;

Column 22, line 60, change "mean" to --means--;

Column 23, line 4, change "an" to --and--.

Signed and Sealed this

Twenty-fourth Day of January, 1989

*Attest:*

DONALD J. QUIGG

*Attesting Officer*      *Commissioner of Patents and Trademarks*